Oct. 13, 1964   R. H. BLAKELEY   3,152,375
QUICK RELEASE FASTENER
Filed Dec. 3, 1962
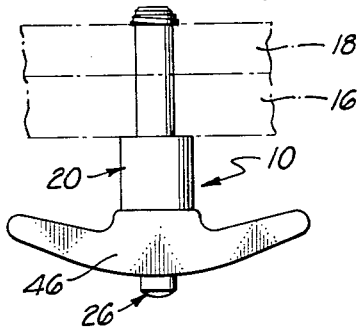
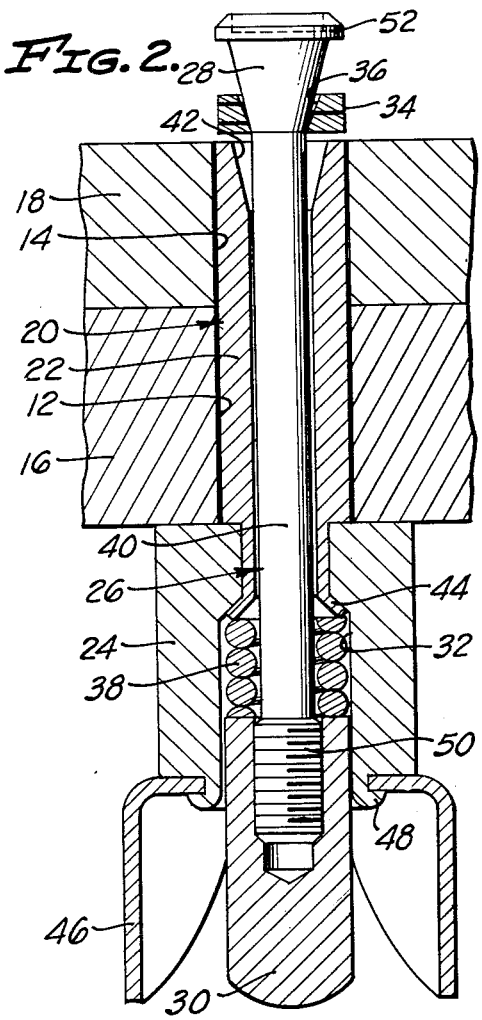
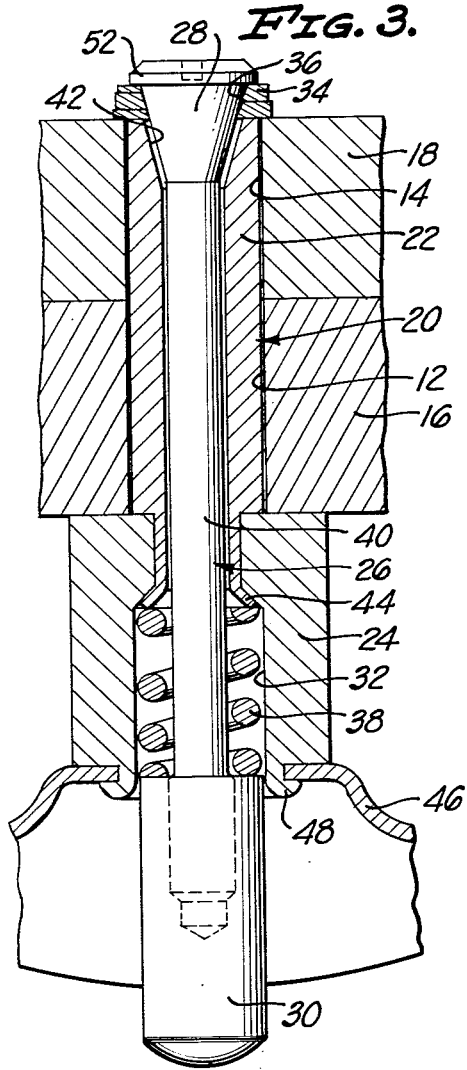
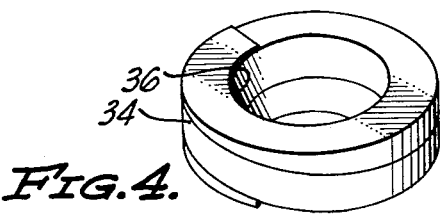
INVENTOR.
RICHARD H. BLAKELEY
BY HIS ATTORNEYS
HARRIS, KIECH, RUSSELL & KERN 3,152,375
QUICK RELEASE FASTENER
Richard H. Blakeley, 2608 Via Ramon,
Palos Verdes Estates, Calif.
Filed Dec. 3, 1962, Ser. No. 241,881
5 Claims. (Cl. 24—211)

This invention relates in general to fasteners and, more particularly, to a quickly releasable fastening device of the type utilized to hold together temporarily two or more plates, or other structural elements, by inserting it into registering holes therein, a general object being to provide an improved fastening device of this general nature.

Still more particularly, the present invention contemplates a fastening device which includes: a tubular member having inner and outer ends and provided at its outer end with a head seatable against the outer or front side of an assembly of structural elements to be secured together; a plunger reciprocable in the tubular member and having inner and outer ends respectively adjacent and respectively projecting axially from the inner and outer ends of the tubular member; expandable means responsive to outward movement of the plunger relative to the tubular member for engaging the inner or rear side of such assembly of structural elements to maintain the fastening device in place; and spring means engaging the tubular member and the plunger and biasing the plunger axially outwardly relative to the tubular member so as to expand the expandable means into engagement with the inner or blind side of the assembly of structural elements.

A primary object of the invention is to provide a fastening device of the foregoing character wherein the expandable means comprises an expandable ring of spring material encircling the plunger adjacent the inner end thereof, and axially inwardly of the inner end of the tubular member, and adapted to be expanded into locking relation with the inner side of the assembly of structural elements by an axially-inwardly divergent frusto-conical head on the inner end of the plunger. With this construction, the spring means displaces the plunger axially outwardly relative to the tubular member so as to force the frusto-conical head on the plunger into the expandable ring so as to expand same to prevent withdrawal of the fastening device.

An important object of the invention is to provide the expandable ring with a frusto-conical opening therein which is complementary to the frusto-conical head on the plunger and which has a larger included angle than such frusto-conical head. This differential between the included an angle of the frusto-conical head and the frusto-conical opening through the expandable ring minimizes friction between the head and the ring, which is an important feature.

Another object of the invention is to provide an expandable ring of the foregoing nature which has the form of a helix.

Another object is to provide a fastening device wherein the spring means is a compression coil spring encircling the plunger and seated against the inner end of a counterbore in the outer end of the tubular member and against an outer head on the plunger adjacent the outer end thereof.

Further objects of the invention are to provide a quickly releasable fastener of the foregoing nature which consists of only a few easily manufactured and easily assembled parts to minimize the cost thereof.

The foregoing objects, advantages, features and results of the present invention, together with various other objects, advantages, features and results thereof which will be evident to those skilled in the fastener art in the light of this disclosure, may be achieved with the exemplary embodiment of the invention described in detail hereinafter and illustrated in the accompanying drawing, in which:

FIG. 1 is a side elevational view of the quickly releasable fastening device of the invention on a reduced scale;

FIG. 2 is a longitudinal sectional view showing the fastener of the invention in a released condition within registering holes in an assembly of structural elements to be secured together;

FIG. 3 is a view similar to FIG. 2, but showing the fastener in a locked condition; and FIG. 4 is a perspective view of an expandable ring forming part of the fastener of the invention.

Referring to the drawing, the numeral 10 designates a quickly releasable fastener of the invention which is shown inserted through registering holes 12 and 14 in outer and inner sheets or plates, or other structural elements, 16 and 18, to be secured together temporarily by the device 10. Obviously, the invention may be utilized with a number of structural elements greater than the two specifically shown.

Basically, the fastening device 10 includes: a tubular member 20 which is provided with a sleeve 22 of a length to extend through the plates 16 and 18 and which is provided at its outer end with a head 24 having an annular surface seatable against the front side of the outer plate 16 to limit insertion of the fastener; a plunger 26 reciprocable in and projecting axially from the inner and outer ends of the tubular member 20, the plunger being provided at its inner end with an axially-inwardly divergent, frusto-conical head 28 and being provided at its outer end with an outer head 30 receivable in an axial counterbore 32 in the head 24 at the outer end of the tubular member 20; an expandable ring 34 of spring material encircling the plunger 26 adjacent the inner end thereof and axially inwardly of the inner end of the tubular member 20 and having a frusto-conical opening 36 complementary to the frusto-conical head 28; and spring means 38 encircling a pin 40 forming part of the plunger 26 and disposed in the counterbore 32 and seated against the inner end of the counterbore 32 and against the outer head 30 on the plunger 26, whereby the spring means 38 biases the plunger 26 axially outwardly relative to the tugular member 20 so as to force the frusto-conical head 28 into the frusto-conical opening 36 in the expandable ring 34 to expand the ring into withdrawal-preventing relation with the rear side of the inner plate 18, as shown in FIG. 3 of the drawing.

Considering the tubular member 20 in more detail, the sleeve 22 thereof is provided at its inner end with a frusto-conical counterbore 42 which receives the frusto-conical head 28 on the plunger 26 when the fastener 10 is in its locked condition. Preferably, the tubular member 20 is of two-piece construction, the sleeve 22 is provided at its outer end with a reduced-diameter portion which extends into the head 24 and which is swaged or spun outwardly against the inner end of the counterbore 32, as indicated at 44. Preferably, the inner end of the counterbore converges axially inwardly to limit the angle through which the portion 44 of the sleeve 22 must be swaged or spun radially outwardly.

The foregoing structure for the tubular member 20 results in manufacturing economies since the sleeve 22 may be formed of commercially available tubing stock, having the necessary inside and outside diameters, with a minimum of machining. Similarly, the head 24 may be formed of commercially available tubing or bar stock with a minimum of machining. Thus, by means of this two-piece construction, it is unnecessary to machine the sleeve 22 down to the desired external diameter from bar or tubing stock having the outside diameter of the head 24.

The fastener 10 includes a handle 46 of any suitable construction. As shown, the handle is provided with an opening through which a reduced diameter portion of the head 24 extends axially outwardly, such portion of the head 24 being swaged or spun radially outwardly, as shown at 48, to secure the handle to the head 24.

The plunger 26 is also of two-piece construction for manufacturing economy, the outer head 30 being formed as one piece and the pin 40 and the frusto-conical inner head 28 as another. Preferably, commercially available bolt stock is utilized for the pin 40 and the frusto-conical head 28, a piece of bolt stock of the necessary length being placed in a standard two-blow header to form the frusto-conical head 28 at the inner end of the pin 40 and a head 50 at the outer end thereof. The head 50 is then threaded externally for threaded insertion into the outer head 30 of the plunger 26. The outer head 30 is simply a piece of bar stock drilled and tapped to receive the head 50 of the pin 40.

The spring means 38 is simply a coil spring which is seated against the inner end of the counterbore 32, or, more accurately, against the swaged portion 44 of the sleeve 22, and which is seated against the inner end of the head 30 on the plunger 26. As will be apparent, the coil spring 38 acts in compression to bias the plunger 26 axially outwardly relative to the tubular member 20. The coil spring 38 is provided with a spring rate sufficient to insure forcing the frusto-conical head 28 on the plunger 26 into the expandable ring 34 so as to expand the ring to a diameter exceeding the diameter of the hole 14 in the inner plate 18. However, the spring rate is, at the same time, kept low enough to permit movement of the plunger 26 to a position to unlock the fastener 10, as shown in FIG. 2 of the drawing, by a reasonable thumb pressure applied to the outer end of the head 30 on the plunger when the user places his fingers under the handle 46.

Turning now to a more detailed consideration of the frusto-conical head 28 and the expandable ring 34, and to the relationship therebetween, the frusto-conical head 28 has a relatively small included angle to minimize frictional resistance as it is forced into the expandable ring 34 by the spring 38, thereby keeping the spring rate of this spring within reasonable limits. The included angle of the frusto-conical head 28 should not exceed about 30° for this reason. Friction is also minimized by making the included angle of the frusto-conical opening 36 through the expandable ring 34 several degrees, e.g., 5°, larger than the included angle of the frusto-conical head 28 on the plunger 26. This differential between the included angles of the frusto-conical head 28 and the frusto-conical opening 36 is the key to easy actuation of the fastener 10 and thus represents an important feature of the invention.

The minimum diameter of the frusto-conical opening 36 through the expandable ring 34, when the ring is unstressed, is substantially equal to, but no less than, the minimum diameter of the frusto-conical head 28. The maximum internal diameter of the expandable ring 34, when unstressed, is substantially equal to the maximum diameter of the frusto-conical head 28, which assists in minimizing the forces required to expand the ring.

When the plunger 26 is displaced axially outwardly relative to the tubular member 20 by the coil spring 38, the expandable ring 34 is clamped between the inner end of the sleeve 22 and the frusto-conical head 28, so that the latter expands the ring. Initially, i.e., when the expandable ring 34 is unstressed, its outside diameter is no larger than the outside diameter of the sleeve 22, and preferably less than the outside diameter of such sleeve, so that it can be inserted through the holes 12 and 14 readily. Upon expansion by the frusto-conical head 28, the outside diameter of the expandable ring 34 is sufficiently larger than the diameter of the hole 14 to insure against inadvertent or accidental withdrawal of the fastener 10. (It will be understood that the fastening device 10 is intended to act primarily in shear, and only to a limited extent in tension.)

To prevent the spring 38 from pulling the frusto-conical head 28 of the plunger 26 all the way through the expandable ring 34, the frusto-conical head is provided at its inner or larger end with an annular flange 52. As will be apparent from FIG. 3 of the drawing, the annular flange 52 provides an annular shoulder acting as a stop for limiting insertion of the frusto-conical head 28 into the expandable ring 34.

In the preferred embodiment of the invention, the expandable ring 34 takes the form of a helix. In the particular construction illustrated, the expandable ring 34 is essentially a closed-coil spring formed of slightly more than two turns of generally rectangular spring stock. The expandable ring 34 may be made with conventional spring making equipment, being machined flat at its ends, machined to the necessary outside diameter in an unstressed state, and machined internally in an unstressed state to provide the desired frusto-conical opening 36.

Thus, the present invention provides a fastener 10 which is easy to use, which is effective for its intended purpose, and which may be manufactured economically.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a quickly releasable fastening device, the combination of:
   (a) a tubular member having inner and outer ends and having a head at its outer end;
   (b) a plunger reciprocable in said tubular member and having inner and outer ends respectively adjacent and respectively projecting axially from the inner and outer ends of said tubular member;
   (c) said plunger having at its inner end an axially-inwardly divergent, frusto-conical head;
   (d) an expandable helical ring of spring material encircling said plunger adjacent the inner end thereof and axially inwardly of the inner end of said tubular member and having a frusto-conical opening complementary to said frusto-conical head;
   (e) said expandable helical ring, when unstressed, having an outside diameter no greater than the outside diameter of said tubular member, having an inside diameter at the smaller end of said frusto-conical opening no less than the diameter of the smaller end of said frusto-conical head, and having an inside diameter at the larger end of said frusto-conical opening less than the diameter of the larger end of said frusto-conical head; and
   (f) means engaging said tubular member and said plunger for moving said plunger axially outwardly relative to said tubular member so as to force said frusto-conical head into said expandable helical ring to expand same.

2. In a quickly releasable fastening device, the combination of:
   (a) a tubular member having inner and outer ends and having a head at its outer end;
   (b) a plunger reciprocable in said tubular member and having inner and outer ends respectively adjacent and respectively projecting axially from the inner and outer ends of said tubular member;
   (c) said plunger having at its inner end an axially-inwardly divergent, frusto-conical head;
   (d) an expandable helical ring of spring material encircling said plunger adjacent the inner end thereof and axially inwardly of the inner end of said tubular member and having a frusto-conical opening complementary to said frusto-conical head;

(e) said expandable helical ring, when unstressed, having an outside diameter no greater than the outside diameter of said tubular member, having an inside diameter at the smaller end of said frusto-conical opening no less than the diameter of the smaller end of said frusto-conical head, and having an inside diameter at the larger end of said frusto-conical opening less than the diameter of the larger end of said frusto-conical head; and (f) spring means engaging said tubular member and said plunger and biasing said plunger axially outwardly relative to said tubular member so as to force said frusto-conical head into said expandable helical ring to expand same.

3. In a quickly releasable fastening device, the combination of:

(a) a tubular member having inner and outer ends and having a head at its outer end;

(b) a plunger reciprocable in said tubular member and having inner and outer ends respectively adjacent and respectively projecting axially from the inner and outer ends of said tubular member;

(c) said plunger having at its inner end an axially-inwardly divergent, frusto-conical head;

(d) an expandable helical ring of spring material encircling said plunger adjacent the inner end thereof and axially inwardly of the inner end of said tubular member and having a frusto-conical opening complementary to and having a larger included angle than said frusto-conical head;

(e) said expandable helical ring, when unstressed, having an outside diameter no greater than the outside diameter of said tubular member, having an inside diameter at the smaller end of said frusto-conical opening no less than the diameter of the smaller end of said frusto-conical head, and having an inside diameter at the larger end of said frusto-conical opening less than the diameter of the larger end of said frusto-conical head; and (f) spring means engaging said tubular member and said plunger and biasing said plunger axially outwardly relative to said tubular member so as to force said frusto-conical head into said expandable helical ring to expand same.

4. In a quickly releasable fastening device, the combination of:

(a) a tubular member having inner and outer ends and having a head at its outer end;

(b) a plunger reciprocable in said tubular member and having inner and outer ends respectively adjacent and respectively projecting axially from the inner and outer ends of said tubular member;

(c) said plunger having at its inner end an axially-inwardly divergent, frusto-conical head;

(d) an expandable helical ring of spring material encircling said plunger adjacent the inner end thereof and axially inwardly of the inner end of said tubular member and having a frusto-conical opening complementary to and having a larger included angle than said frusto-conical head;

(e) said expandable helical ring, when unstressed, having an outside diameter no greater than the outside diameter of said tubular member, having an inside diameter at the smaller end of said frusto-conical opening no less than the diameter of the smaller end of said frusto-conical head, and having an inside diameter at the larger end of said frusto-conical opening less than but nearly equal to the diameter of the larger end of said frusto-conical head; and (f) spring means engaging said tubular member and said plunger and biasing said plunger axially outwardly relative to said tubular member so as to force said frusto-conical head into said expandable helical ring to expand same.

5. In a quickly releasable fastening device, the combination of:

(a) a tubular member having inner and outer ends and having a head at its outer end;

(b) a plunger reciprocable in said tubular member and having inner and outer ends respectively adjacent and respectively projecting axially from the inner and outer ends of said tubular member;

(c) said plunger having at its inner end an axially-inwardly divergent, frusto-conical head;

(d) an expandable helical ring of spring material encircling said plunger adjacent the inner end thereof and axially inwardly of the inner end of said tubular member and having a frusto-conical opening complementary to and having a larger included angle than said frusto-conical head;

(e) said expandable helical ring, when unstressed, having an outside diameter no greater than the outside diameter of said tubular member, having an inside diameter at the smaller end of said frusto-conical opening no less than the diameter of the smaller end of said frusto-conical head, and having an inside diameter at the larger end of said frusto-conical opening less than but nearly equal to the diameter of the larger end of said frusto-conical head;

(f) spring means engaging said tubular member and said plunger and biasing said plunger axially outwardly relative to said tubular member so as to force said frusto-conical head into said expandable helical ring to expand same; and (g) means on said frusto-conical head at the larger end thereof for retaining said expandable helical ring thereon.

References Cited in the file of this patent

UNITED STATES PATENTS

| | | |
|---|---|---|
| 2,373,083 | Brewster | Apr. 3, 1945 |
| 2,640,245 | Becker | June 2, 1953 |
| 3,081,663 | Davis | Mar. 19, 1963 |

UNITED STATES PATENT OFFICE
CERTIFICATE OF CORRECTION

Patent No. 3,152,375                            October 13, 1964

Richard H. Blakeley

It is hereby certified that error appears in the above numbered patent requiring correction and that the said Letters Patent should read as corrected below.

Column 1, line 50, for "an angle" read -- angles --.

Signed and sealed this 23rd day of March 1965.

(SEAL)
Attest:

ERNEST W. SWIDER                           EDWARD J. BRENNER
Attesting Officer                               Commissioner of Patents